F. P. MARTIN.
APPARATUS FOR DELIVERING LIQUID OR GRANULAR MATERIAL IN PREDETERMINED MEASURED QUANTITIES.
APPLICATION FILED DEC. 23, 1920.
1,429,154. Patented Sept. 12, 1922.
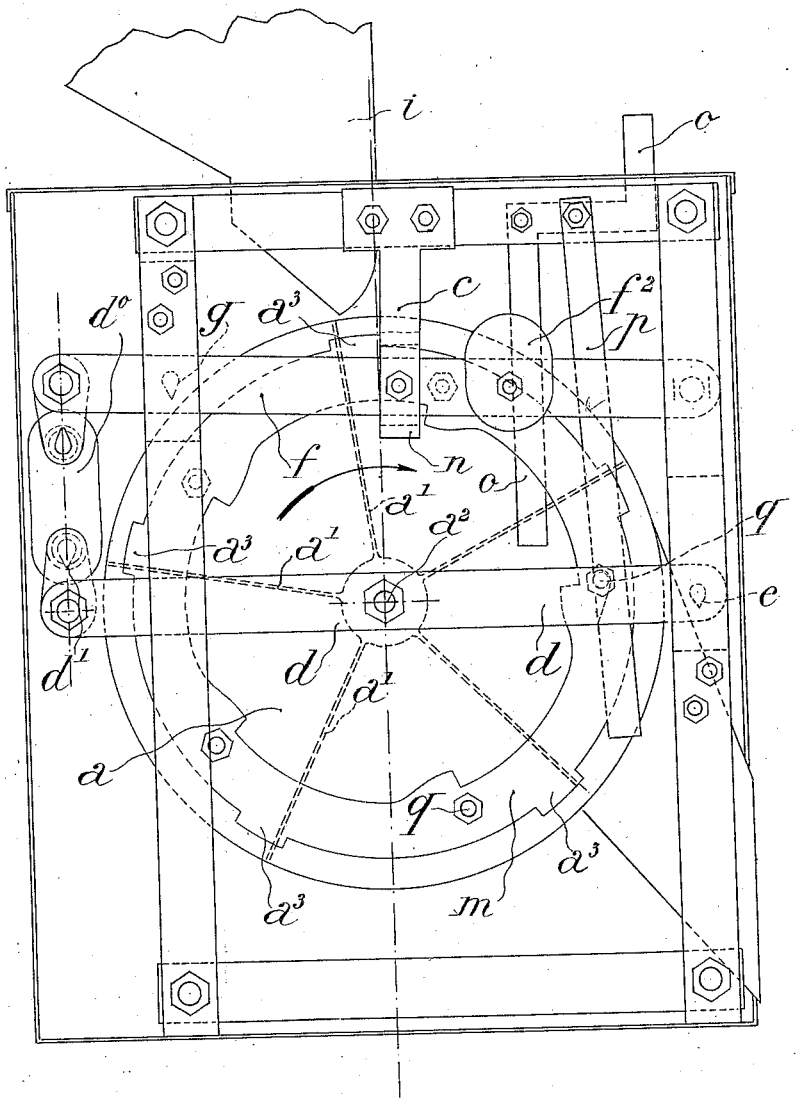
Inventor
Fernand P. Martin
By
Attorney Patented Sept. 12, 1922.

1,429,154

UNITED STATES PATENT OFFICE.

FERNAND PAUL MARTIN, OF PARIS, FRANCE.

APPARATUS FOR DELIVERING LIQUID OR GRANULAR MATERIAL IN PREDETERMINED MEASURED QUANTITIES.

Application filed December 23, 1920. Serial No. 432,806.

*To all whom it may concern:*

Be it known that I, FERNAND PAUL MARTIN, a citizen of the French Republic, residing in Paris, Seine, France, have invented certain new and useful Improvements in Apparatus for Delivering Liquid or Granular Material in Predetermined Measured Quantities, of which the following is a specification.

The invention relates to apparatus for delivering liquid or granular material in predetermined measured quantities and has for its object to provide an apparatus of this kind which is simple in construction and inexpensive in manufacture.

The apparatus comprises essentially a drum divided by radial partitions into an equal number of compartments and suspended by a balance-weight which holds the said drum in a fixed elevated position until the predetermined quantity of the material is introduced into one of the compartments whereupon the drum drops under the weight of the material and turns to the extent of one compartment to discharge the said material, and then returns to its elevated position with the next compartment in a position to be filled and so on.

The invention, which also comprises certain other arrangements more fully referred to hereinafter will be clearly understood from the following description with reference to the accompanying drawing, which latter is however given by way of example only.

The drawing shows the apparatus in elevation.

Referring to the accompanying drawings the drum $a$ comprises two end discs connected together by radial partitions which subdivide it into a number of compartments of equal capacity, said drum being mounted on a spindle $a^2$ on a lever $d$.

The drum $a$ is provided with a set of evenly spaced projections or teeth $a^3$ one for each compartment of the said drum and arranged concentrically on the drum.

A frame supporting the said drum, is provided with an arm $c$ which acts as a stop for the teeth $a^3$ when the drum is in the elevated position.

The stop arm is so arranged that when the drum is in the elevated position, the teeth $a^3$ press against it in the direction indicated by the arrow. When one of the teeth is in engagement with the stop the uppermost compartment is mainly to the right side of the said spindle $a^2$ so that the weight of the contents thereof will tend to turn the drum in the direction indicated by the arrow.

The drum spindle $a^2$ is trunnioned at a suitable point to the lever $d$, one end of which is fulcrumed at $e$ to the frame, whilst the other end is fulcrumed at $d^1$ to a link $d^0$, the other end of said link being fulcrumed to one branch of a lever $f$ which in turn is fulcrumed to the frame at $g$. Lever $f$ has a branch carrying a balance weight $f^2$.

The balance weight $f^2$ is so arranged that the drum is held in the elevated position until the desired predetermined quantity of material is introduced into the uppermost compartment, whereupon the weight is raised and the drum sinks. The projection $a^3$ becoming disengaged from the stop arm $c$, permits the drum to rotate in the direction of the arrow to the extent of the width of one compartment and discharge the contents from the comparment.

Above the drum is arranged a hopper $i$ which discharges into the uppermost compartment of the drum, and preferably close to the uppermost partition.

Means are provided for causing the drum, to return to the elevated position after it has rotated to the extent of one compartment said means comprising preferably a set of cams on a ring concentric with the spindle $a^2$, there being one cam for each compartment. The cams when rotating slide over a fixed abutment $n$ on the stop member $c$. The cams and the teeth $a^3$ are preferably formed upon a common ring mounted at one side of the drum.

The apparatus is preferably provided with a lever $o$ operated at each turning movement of the drum by a stop, not shown provided on said drum; the lever being used for operating a suitable counting mechanism.

The apparatus may also be provided with a pawl $p$ pivoted to the frame and adapted to engage by gravity, pins $q$ on the drum to prevent the drum rotating in the opposite direction.

It should be understood that the invention is not limited to the particular construction described and illustrated but may comprise various modifications within the scope of the appended claims.

What I claim as my invention and desire to secure by Letters Patent is:—

1. Apparatus for delivering liquid or granular material in predetermined measured quantities, comprising a vertically movable drum divided into a plurality of compartments of equal capacity, means for normally holding the drum in elevated position and depressible by a predetermined weight of said material, an escapement mechanism associated with the drum comprising a pair of fixed lugs, teeth on said drum adapted to engage one of said lugs to stop the drum when elevated, and cams on said drum adapted to ride over the other of said lugs for elevating the drum when empty.

2. Apparatus for delivering liquid or granular material in predetermined measured quantities, comprising a vertically movable drum divided into a plurality of compartments of equal capacity, means for normally holding the drum in elevated position and depressible by a predetermined weight of said material, an escapement mechanism associated with the drum comprising a pair of fixed lugs, teeth on said drum adapted to engage one of said lugs to stop the drum when elevated, and cams on said drum adapted to ride over the other of said lugs for elevating the drum when empty.

3. Apparatus for delivering liquid or granular material in predetermined measured quantities, comprising a vertically movable drum divided into a plurality of compartments of equal capacity, means for normally holding the drum in elevated position and depressible by a predetermined weight of said material, said means comprising a pair of levers one of which is fulcrumed at one end and the other intermediate of its ends, said levers being connected together by means of a link at adjacent ends, the lever which is fulcrumed at its end supporting the drum and the lever fulcrumed intermediate of its ends having an adjustable counter-weight on its free end.

4. Apparatus for delivering liquid or granular material in predetermined measured quantities, comprising a vertically movable drum divided into a plurality of compartments of equal capacity, means for normally holding the drum in elevated position and depressible by a predetermined weight of said material, an escapement associated with said drum, means for preventing rotation of the drum except in one direction comprising lugs on the drum, and a pawl adjacent the drum and having a shoulder on said pawl adapted to receive said lugs.

In testimony whereof I have signed my name to this specification in the presence of a subscribing witness.

FERNAND PAUL MARTIN.

Witness:
S. TUTTLE.